United States Patent [19]

Bersheim

[11] Patent Number: 4,491,325
[45] Date of Patent: Jan. 1, 1985

[54] GAME CONTROL APPARATUS

[76] Inventor: Thomas Bersheim, 5816 S. Washtenaw, Chicago, Ill. 60629

[21] Appl. No.: 462,093

[22] Filed: Jan. 26, 1983

[51] Int. Cl.³ .......................... A63F 9/22; G05G 9/00; H01H 19/08; H01H 3/04
[52] U.S. Cl. ................................ 273/148 B; 200/6 A; 200/DIG. 2; 74/471 XY; 74/523; 273/DIG. 28
[58] Field of Search .................... 74/471 XY, 523; 273/DIG. 28, 16 C, 148 B, 148 R; 200/6 A, DIG. 2; 224/267; 180/DIG. 3; 3/1.1, 12.3; 46/249, 250, 253, 254, 255

[56] References Cited

U.S. PATENT DOCUMENTS

| | | | |
|---|---|---|---|
| 3,018,750 | 1/1962 | Hill | 200/6 A X |
| 3,022,878 | 2/1962 | Seibel et al. | 52/155 X |
| 3,142,227 | 7/1964 | Stringer | 89/136 |
| 3,172,300 | 3/1965 | Schneider | 74/471 XY |
| 3,229,059 | 1/1966 | Beatty | 200/61.41 |
| 3,573,412 | 4/1971 | Uhrich | 200/6 A X |
| 3,700,836 | 10/1972 | Rackson | 200/DIG. 2 |
| 3,717,856 | 2/1973 | Evans | 273/DIG. 28 X |
| 3,929,335 | 12/1975 | Malick | 273/DIG. 28 |
| 4,012,014 | 3/1977 | Marshall | 74/471 XY X |
| 4,045,630 | 8/1977 | McCarthy et al. | 200/DIG. 2 |
| 4,150,803 | 4/1979 | Fernandez | 244/135 A |
| 4,195,722 | 4/1980 | Anderson et al. | 200/DIG. 2 X |
| 4,200,166 | 4/1980 | Hansen | 273/148 B |
| 4,450,325 | 5/1984 | Lugue | 200/6 A X |

FOREIGN PATENT DOCUMENTS

| | | | |
|---|---|---|---|
| 2109905 | 6/1983 | United Kingdom | 74/471 XY |
| 2119067 | 11/1983 | United Kingdom | 74/471 XY |

OTHER PUBLICATIONS

"Servo System Amplifies Muscle Power" *Product Engineering Mag.*, Jul. 24, 1961, pp. 15-16.

*Primary Examiner*—Richard C. Pinkham
*Assistant Examiner*—Scott L. Brown
*Attorney, Agent, or Firm*—Leo J. Aubel

[57] ABSTRACT

Control apparatus for video games has a control handle spaced apart from and joined to a separate housing by a connecting rod. The housing is contoured and securable to a user's arm, and forms an anchor point for manipulation of the control handle. The user may choose between variable resistive controls and switch controls which operate responsive to movement of the control handle and/or the connecting rod. Multiple individual controls may also be mounted on the handle to control other game functions. Plates having cutouts formed therethrough are attachable to the housing, with the control rod protruding therethrough, the movement of the control rod may thereby be limited by contact with the periphery of the cutout, preventing simultaneous engagement of two or more signal controls.

53 Claims, 11 Drawing Figures

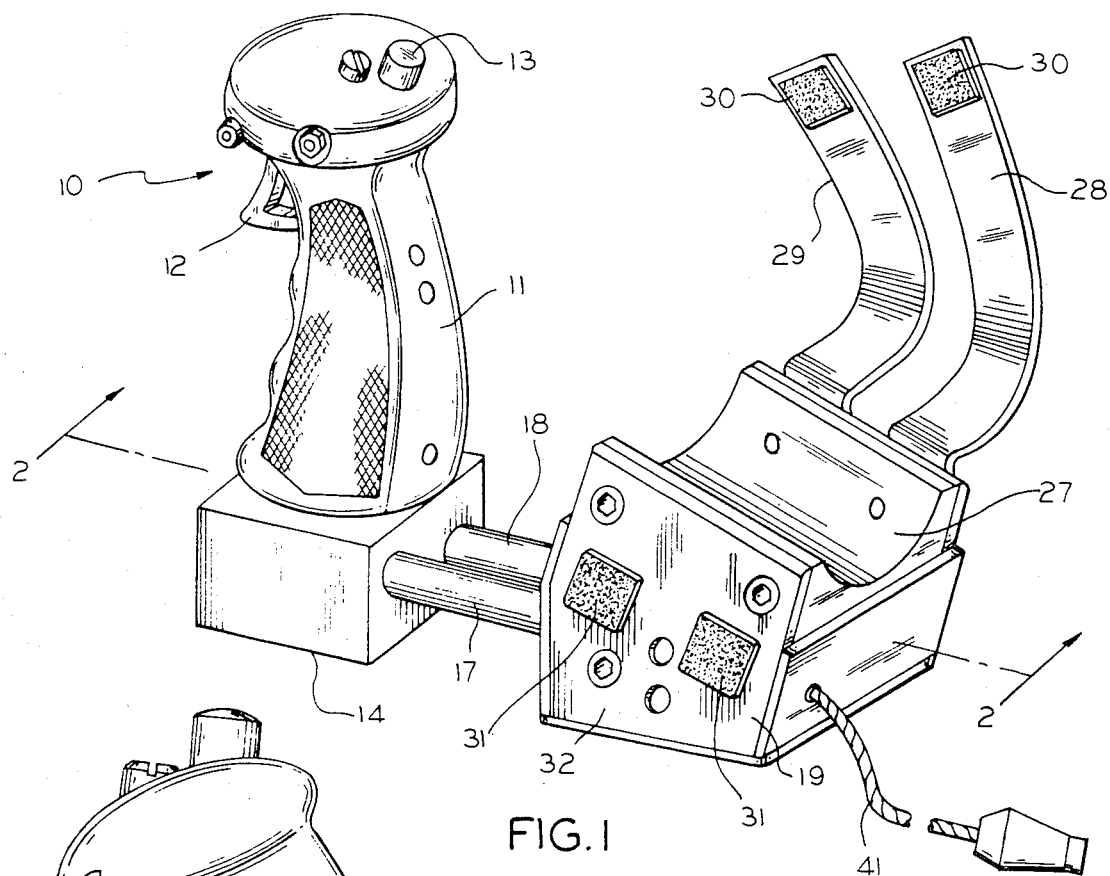
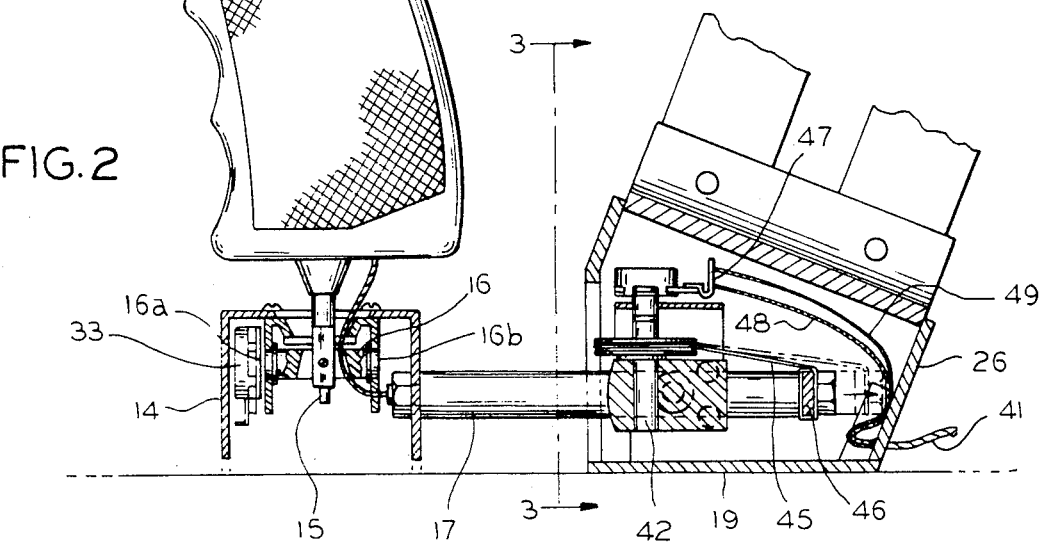

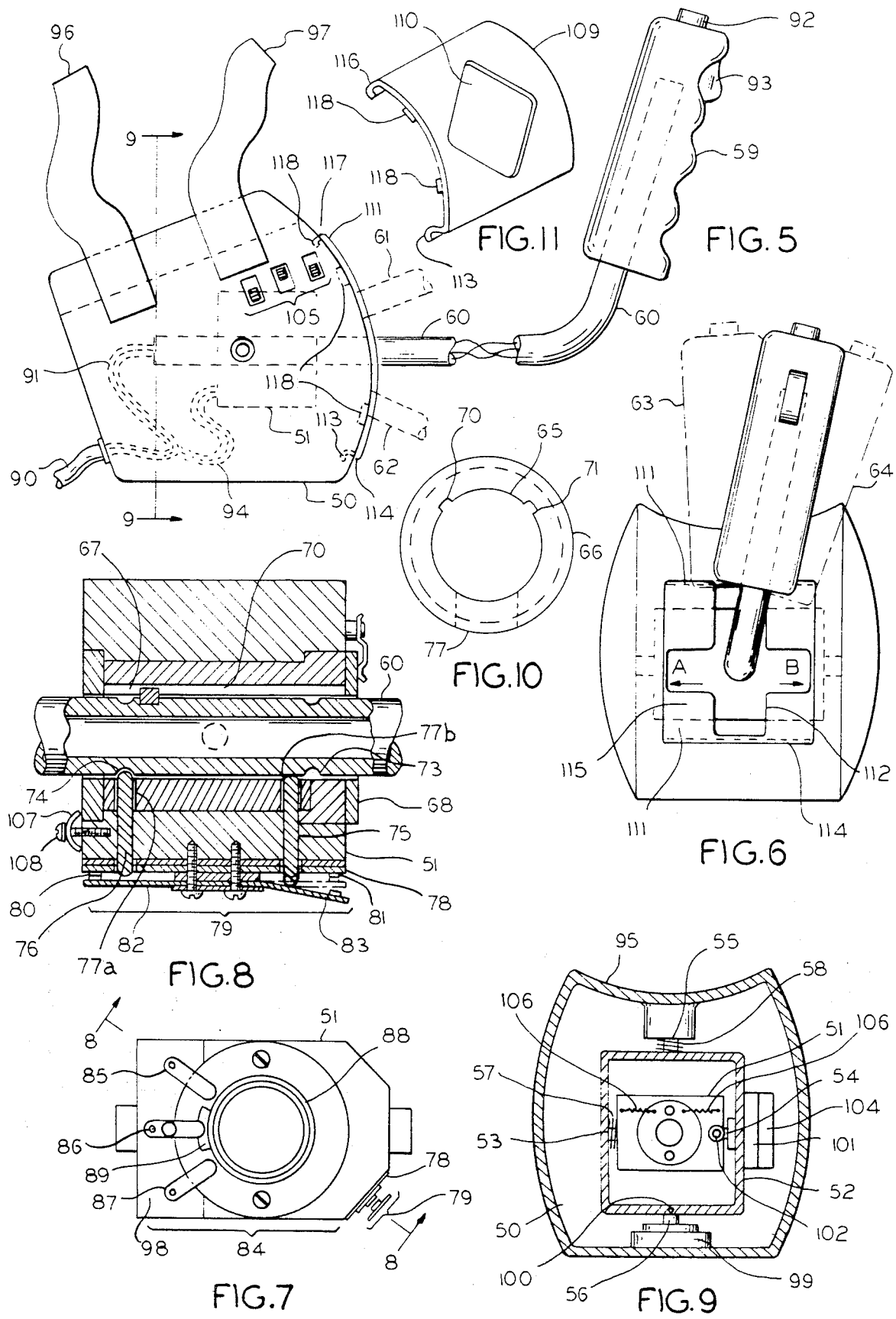

GAME CONTROL APPARATUS

BACKGROUND OF THE INVENTION

This application relates generally to electrical control apparatus and, more particularly, to apparatus for controlling the position and movement of a cursor on a cathode ray tube display, such as a hand-held control for use in operating electronic audio-visual apparatus.

One important by-product of the microcomputer revolution has been the creation of numerous electronic audio-visual entertainment devices commonly known as "video games". Such games made their first important commercial impact in video game arcades, where stand-alone cabinets housed all of the computer and visual display elements necessary to allow one to play the game by inserting a coin or token. Typically, each such game involves one or more visual displays on a cathode ray tube which constitute the "boards", or playing fields for the playing of the game. Each such game involves manipulation of an electronic cursor, or character, which appears on the video screen, by the operation of one or more control devices, or control sticks. Depending upon the game selected, the player-controlled game character may be assigned to shoot down and destroy alien space ships, outwit a pack of attacking monsters as it travels through a maze, rescue a maiden from the clutches of a menacing gorilla, guide a frog safely across a heavily-traveled highway and peril-choked river to safety, or various other "missions" depending upon the ingenuity, imagination and inspiration of the game's creator. All such games have one thing in common: successful manipulation by the player of the video game relies upon use of the game's individual controls.

With the increased popularity and affordability of computers, and the production of more specialized mini-computer game apparatus, it is now possible to play these and other video games at home. Along with the hardware necessary to convert a television receiver into an arcade-like playing field, such home systems typically include a processing unit which accepts discs or cartridges upon which the software for the game involved is embedded, and a control or "joy stick" identical in function to that utilized in the arcade game units.

Such joysticks have heretofore suffered serious shortcomings, inconveniences, and inadequacies when compared to the controls available on full-size arcade video game consoles. Most typically, the joy stick provided with the home video versions of such games is connected to the central unit by a length of wire or cable and essentially comprises a small, lightweight base from which a control lever protrudes. Occasionally, one or more push buttons may also be present on the base.

Such an arrangment suffers from an inherent lack of stability and most often requires the player to use two hands for accurate manipulation because the joy stick is not anchored to any kind of solid base. In addition, some games require a relatively large number of individual controls calling for use of two hands, where all the controls are anchored to a single control panel. Under those conditions, the prior art joy sticks are totally inadequate and it is not possible to conveniently operate the controls for the home version of such a game with one hand while retaining any type of accurate control over the movement of the character on the video screen.

There exists in the prior art such issued U.S. Pat. Nos. 4,331,849, 3,700,836, 3,142,227, and 3,229,059, all of which illustrate manually manipulable control elements. None, however, solve the problems addressed by the present invention. The '849 reference shows a control lever for a toy but does not demonstrate how such a control lever may be successfully used with one hand. The '836 reference shows a hand operated push button control with an attaching wrist strap, a device which does not provide for the type of control flexibility required by the video games herein discussed. The '227 reference illustrates an aircraft-type control handle with numerous control buttons mounted thereon, but without any teaching which would enable such a unit to be modified for use as a computer or video game joy stick. The remaining reference, '059, illustrates a control unit operable by various parts of the body for use by paraplegics in opening or closing an electrical circuit, again, without any teaching directly applicable to the problem addressed by the present invention.

Most typically, motion on the screen of a video game requires direction of movement along the horizontal and vertical axes of the screen, which generally requires the generation and control of at least two electrical signals. Other more specialized functions, such as the speed at which the player-character moves or the capability of the player-character to fire weapons or reverse directions may be controlled by separate push button controls. It is essential to be able to quickly and responsively control the motion and functions of the player-character with a single, hand-held control in order for such games to be enjoyable.

Accordingly, the need exists for a simple, effective and economical video game control which enables the accurate movement and control of a video game character upon the game screen with a single, control device.

BRIEF DESCRIPTION OF THE INVENTION

A main housing is connected by way of control wires, cables, or the like to a video game unit. The housing is also releasably attachable to a player's forearm, as by elastic straps, to provide an anchoring or securing point for the housing which is freely moveable with the user's arm. At least one connecting rod extends from the housing and is free to move with respect to the housing. Means are provided within the housing to vary the strength of an electrical signal responsive to the movement of the control rod assembly. Such control means may take the form of rotary or linear potentiometers, capacitance units, and/or multi-position switches with inward and outward movement either opening or closing the switches or various combinations of there units.

A control handle is attached to the outermost extent of the control rod assembly, with means being provided to allow movement of the control handle with respect to the housing. Means are also provided to vary the strength or duration of an electrical signal responsive to this motion of the control handle. In one preferred embodiment, moving the control handle rotates the shaft of a rotary potentiometer or rotary switch mechanism. In another preferred embodiment, the handle and control rod assembly rotate as a unit, with such rotary motion translated into actuation of a rotary potentiometer or electrical switch.

Separate means may also be provided on the control handle, such as one or more triggers and/or control buttons to enable the selective engagement of other game features, all through use of one hand.

In use, the housing is attached, as by elastic straps, to the forearm of a game player at a position which enables the player to grip the control handle comfortably. Movement of the player's hand and wrist enables the player to move the control rod assembly with respect to the housing, using only one hand. In this way, the typical control constraints of horizontal and vertical motion on the game screen may be met without requiring the joy stick to be secured to a separate flat surface, or to be held by one hand while moved with the other. Attaching the housing to the forearm provides an anchoring point against which force may be exerted by movement of the wrist and/or hand to cause motion of the control handle with respect to the housing.

Yet another aspect of the present invention enables the user to adjust the rotation of the handle with respect to the housing in order to accomodate both left- and right-handed players. Preferred ways to accomplish this result are to utilize a rotatable bushing into which one or more keyways are formed, and to include a key member on the control rod assembly which may be inserted into a desired keyway in the bushing or to use a set lock or jam washer to lock the handle in a selected attitude of rotation.

A further aspect of the present invention is the inclusion of both variable-resistive-type controls and switch-type controls in the same housing, with means to select one or the other based upon the type of game being played.

BRIEF DESCRIPTION OF THE DRAWINGS

These and further aspects of the present invention will become more apparent upon consideration of the accompanying drawings, wherein:

FIG. 1 is a perspective view of a first preferred embodiment of the present invention;

FIG. 2 is a partial sectional view taken along line 2—2 of FIG. 1;

FIG. 5 is a side elevation of another embodiment of the present invention;

FIG. 6 is a front view of the embodiment shown in FIG. 5;

FIG. 7 is a rear elevation view of the control block of the device shown in FIG. 5;

FIG. 8 is a sectional view along line 8—8 of FIG. 7;

FIG. 9 is a sectional view taken along 9—9 of FIG. 5;

FIG. 10 is a rear view of the bushing shown in FIG. 8; and

FIG. 11 is a perspective view of a gate utilizable to limit and control movement of the control handle.

DETAILED DESCRIPTION OF THE INVENTION

Figure 3:
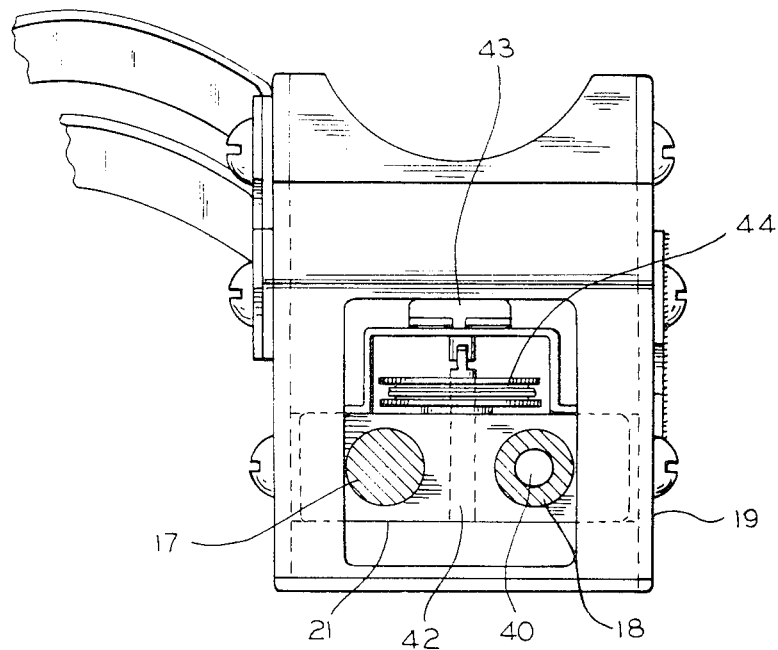
FIG. 3 is a view taken along 3—3 of FIG. 2.

Referring now to FIG. 1, the numeral 10 indicates generally a control assembly, or joystick which for the purposes of illustration, will be referred to as used with a video game. It should be understood that reference herein to video games is not intended to limit the scope or application of the present invention but is made by way of a preferred and intended aspect of use of the present invention.

Control assembly 10 includes a control handle 11 upon which may be mounted further function control devices such as trigger 12 and push button 13. It is to be understood that the inclusion and number of such additional auxiliary control devices may be determined by the number of functions over which control must be maintained. As an example, a second version of this configuration may include a second or even third trigger mechanism to provide a multiple function capability to control unit 10.

As best seen in FIG. 2, handle 11 is rotatably mounted to handle base 14. In the illustrated embodiment, such attachment is by way of handle shaft 15 which is attached by pin or other suitable fastener to control shaft 16. In the illustrated embodiment, control shaft 16 is rotatably supported at ends 16a and 16b, thus providing a "side-to-side" movement to handle 11.

Handle base 14 is secured to at least one control rod 17, as seen in FIG. 2. The embodiment illustrated in FIGS. 1, 2, 3 and 4 includes a pair of such connecting rods 17 and 18.

Figure 4:
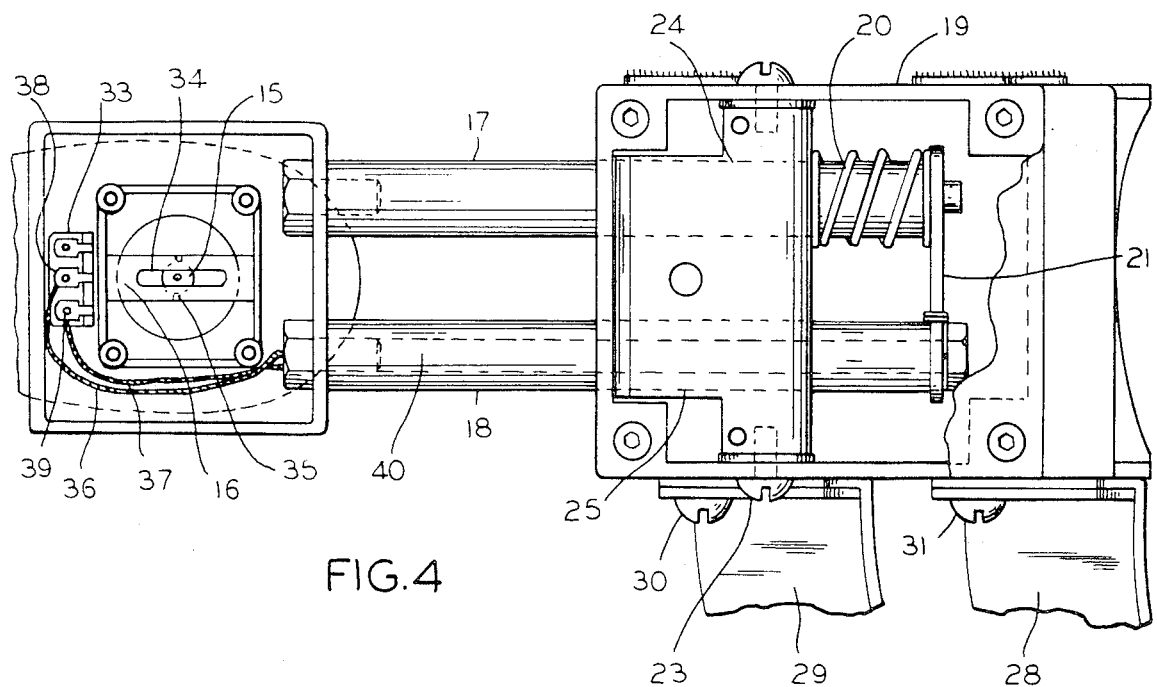
FIG. 4 is a partial botton sectional view of the embodiment shown in FIG. 1.

As seen in FIGS. 2 and 4, connecting rods 7 and 18 are linearly slidably connected to base housing 19. As seen in FIG. 4, return spring 20 is utilized to hold connecting rods 17 and 18, and thereby control handle 11, in fixed spatial relationship with base housing 19 when at rest. As seen in FIG. 4, connecting rods 17 and 18 may be attached side-by-side by link 21 and thus move together.

Connecting rods 17 and 18 are mounted on switch block 21 which is pivotally held within base 19 by pivot screws 22 and 23. Connecting rods 17 and 18 slide in switch block channels 24 and 25 respectively and are limited in their inward travel by rear base wall 26 and in their outer travel by plate 21.

Means are also provided to anchor base 19 to the arm of a user. Upper base surface 27 is contoured, as shown in FIG. 1 to enable comfortable attachment to the arm of a user. In the embodiment herein illustrated, elastic straps 28 and 29 are anchored to base 19 by anchor screws 30 and 31 respectively. Each said strap has a fastener segment 30 proximate its terminal end which releasably mates with anchor segments 31 positioned on sidewall 32 of base 19. The embodiment herein selected utilizes hook-and-loop fasteners made from nylon, and known generally under the trademark VELCRO. Other anchoring systems, such as snaps, buckles, and the like may also be employed.

With base 19 held to the user's arm by straps 28 and 29, the user's hand may grasp handle 11 and, by movement of the wrist, force connecting rods 17 and 18 in and out of base 19 as desired. Such movement may be effected without respect to the position of the user's arm, that is, the arm may be held horizontally, vertically or at any angle therebetween while retaining the ability to move handle 11 toward or away from housing 19. For purposes of convenience, motion into and out of base 19 will be characterized as fore-and-aft movement, while movement of handle 11 such as shown by A-B of FIG. 6 will be referred to as side-to-side movement.

Use of control unit 10 with video games requires control of electrical voltages and/or currents responsive to the degrees of motion described hereinabove. In FIG. 2, and FIG. 4, one such elecrical control is characterized by first rotary potentiometer 33. The operative elements of first potentiometer 33 are moved by rotation of control shaft 16 in a clockwise or anti-clockwise direction with respect to potentiometer 33. As seen in FIG. 2, control shaft 16 is attached to handle shaft 15. In FIG. 4, a preferred form of attachment is illustrated wherein control shaft 16 has an axially extending slot milled therethrough and handle shaft 15 is formed with a pair of opposed flat faces sized to fit within slot 34 of control shaft 16. A fastener, such as a screw or pin 35 is then driven through handle shaft 15 and control shaft 16 to anchor the shafts together. Thus, as handle 11 is moved from side-to-side, rotational motion is imparted to control shaft 16 and thereby to potentiometer 33.

It should be noted that such rotary motion of handle 11 may be accomplished independent of the linear motion of connecting rods 17 and 18. In like fashion, said linear movement capabilities may be executed independent of the rotational movement of control shaft 16.

As seen in FIG. 4, electrical leads 36 and 37 may be attached to terminals 38 and 39 of potentiometer 33 and passed through connecting rod 18 via connecting rod channel 40 and thereafter, via cable 41, to terminate in a plug or other electrical terminal suitable for attachment to the particular electronic device with which the control unit 10 is intended to be used.

Referring now to FIGS. 2 and 3, vertical shaft 42 is rotatably mounted to switch block 21 and, thereby, to second potentiometer 43, whereby rotation of shaft 42 operates potentiometer 43. Drive wheel 44 is attached to shaft 42 immediately above switch block 21 whereby the turning of drive wheel 44 rotates shaft 42. As seen in FIG. 2, a drive cord 45 is secured at one end to drive wheel 44 with several turns thereof wrapped around drive wheel 44. The other end of cord 45 is attached to the end of connecting rod 17 by cord anchor 46. Shaft 42 is biased, as by a spring, to rewind, or take up any slack of cord 45.

In use, as connecting rods 17 and 18 are forced through switch block 21 towards the rear of base 19, cord 45 is drawn from drive wheel 44 thereby rotating said drive wheel and operating second potentiometer 43. When connecting rods 17 and 18 are drawn outwardly from switch block 21, shaft 42 is rotated responsive to the biasing element and second potentiometer 43 is thereby rotated in the opposite direction.

As with first potentiometer 33, terminals 47 provide attached point for electrical leads such as 48 and 49 which are then included in cable 41 for attached to the device being controlled.

It should be noted that the inclusion of potentiometers 33 and 43 are by way of example. It is contemplated that other electrical control units operable responsive to either linear or rotary motion of a mechanical element may also be employed, such as, rotary contact switches, linear potentiometers, or capacitance-regulating devices.

Other embodiments of the present invention are illustrated in FIGS. 5–10. As seen in FIGS. 5 and 9, base 50 has switch block 51 mounted therein with switch block 51 rotatably supported within frame 52 at pivot points 53 and 54. Frame 52 is, in turn, rotatably mounted within base 50 along an axis perpendicular to that of the axes of rotation of switch block 51, at frame pivot shafts 55 and 56. Pivot springs 57 and 58 are utilized to maintain and align switch block 51 within frame 52, and frame 52 within base 50, respectively.

Control handle 59 is mounted to connecting rod 60 and in one embodiment of the present invention, is moveable in an up-and-down direction as shown in phantom at 61 and 62 of FIG. 5, in side-to-side motion as shown in phantom at 63 and 64 of FIG. 6, and in fore-and-aft motion as will be described herein below.

As seen in FIG. 8, connecting rod 60 is slidably received within channel 65 of bushing 66. In turn, bushing 66 is rotatably inserted into switch block channel 67 and secured therewithin by end plates 68 and 69.

As seen in FIG. 10, bushing 66 has a pair of keyways, 70 and 71 formed longitudinally therethough. In FIG. 8, keyway 70 is shown with key 72 attached to control rod 60 and slidably mounted within keyway 70, whereby rotating control rod 60 rotates bushing 66.

As seen in FIG. 8, connecting rod 60 has circumferentially extending grooves 73 and 74 milled thereabout. A pair of switch pins 75 and 76 are slidably inserted through pin apertures formed in switch block 51. Said switch pins are moved and controlled by the motion of connecting rod 60 in a manner hereinafter explained. As seen in FIG. 10 and FIG. 8, bushing 66 has radially-extending slots or windows 77a and 77b formed therethrough to enable switch pins 75 and 76 to pass therethrough and contact connecting rod 60. In yet another embodiment, a single milled groove, such as 73, may be used, to vary the distance through which connecting rod 60 must be moved fore-and-aft to engage or disengage said pin or pins.

On one exterior surface 78 of switch block 51, first switch assembly 79 is attached, consisting of contact points 80 and 81 and contact arms 82 and 83. As shown in FIG. 7, when a switch pin, such as 75 protrudes from switch block 51, contact arm 83 is forced upward, away from contact 81. When a switch pin such as shown at 76 is allowed to slide into switch block 51, contact arm 82 closes upon contact 80. Contact arms 82 and 83 are formed from a springy metal material, such as spring steel, wherein each such arm is normally biased to close upon its corresponding contact.

As FIG. 8 shows, when one of the circumferentially extending slots 73 and 74 registers with its corresponding switch pin 75 or 76, said pin is forced into switch block 51 by the spring action of the corresponding contact arm 82 or 83. When connecting rod 60 is moved such that said switch pin is brought out of register with its corresponding circumferential slot, said switch pin is forced outward from switch block 51 thereby moving the corresponding contact arm away from the corresponding contact.

In this fashion, an electrical circuit may be completed or interrupted by the fore-and-aft movement of connecting rod 60 linearly through switch block 51 and the connection of electrically conductive wiring to the contact side of the assembly and to the contact arm side of switch assembly 79.

As seen in FIG. 7, rotary switch assembly 84 may be secured to the face of switch block 51, with contacts 85, 86 and 87 insulated one from the other by insulating material 98 and attached to switch block 51. A collar 88 having an electrically conductive strip 89 mounted thereto may be rotatably associated with connecting rod 60 such that movement of connecting rod 60 in a left or right direction will bring conductive strip 89 into a position to bridge either contacts 85 and 86 or 86 and 87. In this fashion, side-to-side, or rotational motion of connecting rod 60 will provide another degree of electrical control utilizable for the operation of a video game device.

Electrical cable 90, as shown in FIG. 5, includes electrically conductive wiring members 91 passing through connecting rod 60 and thereby into handle 59 to enable operation of push button 92 and trigger 93. In like fashion, electrical wiring elements 94 are provided to extend to switch assembly 79 and switch assembly 84, and thereby to cable 90 for attachment to the particular electronic video device.

As with the foregoing embodiment, switch assemblies 79 and 84 are exemplary of other electrical controls which operate responsive to the motion of a mechanical part.

As seen in FIGS. 5 and 9, base 50 includes a contoured top 95 and attaching straps 96 and 97 for the anchoring thereof to a user's arm. Such anchoring enables the convenient and efficacious sliding and rotation of control rod 60 via handle 59 to enable operation of switch assemblies 79 and 84.

As seen in FIG. 10, two or more keyways may be provided in bushing 66 to enable the angular adjustment of connecting rod 60 with respect to bushing 66. It is contemplated that such adjustment may be desirable for making handle 59 adjustable for more comfortable use by left handed or right handed users.

While switch pins 75 and 76 act to actuate switch assembly 79 as hereinabove described, said switch pins also act as limiting devices to limit the rotation of connecting rod 60. In like fashion, key 72 attached to connecting rod 60 acts to prevent the removal of connecting rod 60 from switch block 51 and thereby from base 50.

The present arrangement of switch assemblies 79 and 84 are illustrated to preclude the closing of both switch members in each assembly simultaneously. In FIG. 8, circumferential slot 74 is shown in register with a corresponding switch pin, while slot 73 is out of register. Similarly, conductive strip 89 is sized to preclude the bridging of all three contact 85, 86 and 87 simultaneously. Said arrangements may also be adjusted to provide a position wherein no current is flowing through either switch assembly. Again, these parameters may be varied to correspond with the demands made upon the control unit by the individual video game device being used.

A third embodiment of the present invention may be illustrated and understood by reference to FIGS. 5 and 9. In FIG. 9, a first rotary potentiometer 99 is secured to housing 50, with the rotation of pivot shaft 56 acting to operate potentiometer 99. Movement of handle 59 in a side-to-side direction, as shown by line A-B of FIG. 6, would thus operate potentiometer 99. Pivot shaft 56 may be secured to frame 52 by, for example, set screw 100.

As shown in FIG. 9, frame 52 is rectangular, with pivots 55 and 56 aligned along a vertical axis extending through the frame's top and bottom, and pivots 53 and 54 aligned along a horizontal axis extending through the sides of frame 52. It is contemplated that frame 52 may be fashioned in other shapes as well, such as circular. The vertical and horizontal axes described above are preferably perpendicular to one another, in the sense that even if not coplanar, said axes would be perpendicular if made coplanar. As desired or required, siad axes may be offset so as to be non-coplanar, or may be non-perpendicular, as the motion or geometry of the control device is changed.

In like fashion, pivot shaft 54 may be utilized to operate rotary potentiometer 101, through the up-and-down movement of handle 59 as shown in phantom at 61 and 62 of FIG. 5. Shaft 54 may be secured to frame 52 by set screw 102. In this fashion, two degrees of electrical control are available in the side-to-side and up-and-down degrees of handle motion. Connecting rod 60 may then be secured in a single position by, for example, use of a curved washer 107, as shown in FIG. 8, secured to switch block 51 by threaded fastener 108. As fastener 108 is screwed into switch block 51, it exerts a variably increasing force on end plate 69 and, thereby, on bushing 66. The angle at which handle 59 is held when the rest position may then be varied by exerting enough rotational force on handle 59 to overcome the force exerted by curved washer 107, as seen in FIG. 6. After such adjustment, curved washer 107 exerts enough force to enable further manipulation of handle 59 while still retaining its angle of adjustment.

A degree of fore-and-aft motion may be retained, even where no electrical function is effected thereby, in order to facilitate the side-to-side and up-and-down motion of control handle 59.

While operation of the present invention has been illustrated in terms of actuating rotary-type voltage control devices (such as a potentiometer), or intermittent-type control devices (such as switch contacts), it should be stressed that any combination of such devices, together with other control elements, may be present, as required.

In a preferred embodiment, both switches and variable-resistance elements are present, and a control switch or switches mounted to apparatus 10 allows the user to select between them, based upon the requirements of the game being played. As an example, one game may operate best with "off-on" type control, so switch contacts may be preferred.

Another game may have functions which respond to variations in voltages, so a variable-resistance control element may work more suitably. An individual switch may be provided for each degree of motion, enabling selection of various control types with various functions.

Control elements may also be furnished for all three modes of motion, with provision to select as many as need be for game operation.

As seen in FIG. 9, one way such control flexibility may be achieved would be to "gang" a rotary switch 104 to, for example, potentiometer 101, with a separate switch wired to enable selection of potentiometer 101, switch 104, neither, or both, for use during play. Such switches may be mounted to housing 50, at, for example, 105 as shown in FIG. 5.

Reference to FIG. 6 and FIG. 11 illustrate yet another aspect of the present invention. A snap-on gate 109 may be provided with a center cut-out 110 through which control rod 60 must pass. As an example, gat cutout 110, shown in FIG. 11 is generally square, and may limit movement of handle 59 to prevent the simultaneous engagement of two voltage control devices. Gate 11, shown in FIG. 6, may further limit movement of handle 59 to lateral and vertical movement, by providing a substantially cross-shaped cutout 112.

Gates 109 and 111 are exemplary only; other cutout shapes may be selected to change the operation and the "feel" of the game.

As seen in FIGS. 5, 6 and 11, gate 109 has an inwardly curved lip 113 formed along its bottom edge to engage the lower edge 114 of window 115 on housing 50, through which control rod 60 extends. Locking tabs, such as that shown at 116, may be used to engage upper edge 117 of window 115, and tabs, such as shown at 118 may be used to center gate 109 in window 115. Of course, other fastening devices may be used in place of those described above, as size, materials, and preferences dictate.

As shown in FIGS. 5 and 11, gate 109 is curved to match the curvature of housing 50 for a neat, attractive, appearance, and such gates may easily be removed or interchanged as the user sees fit.

While the present invention has been described for operation by a user's hands, it should be noted that such use is not so restricted. The device may readily be adapted, for example, to allow attachment of the housing to a user's leg and to provide for manipulation of the handle by a user's foot, allowing operation of the apparatus by movement of the foot at the ankle. Straps such as those shown at 96 and 97 of FIG. 5 may be used to attach handle 59 to the user's foot. Such an arrangement would find particular application for users with impaired mobility suffered through injury or degenerative disease.

Where connecting rod 60 is rotated in bushing 66, a pair of return springs 106, as shown in FIG. 9, may be employed to bias connecting rod 60, and thereby, handle 59, toward a centered, "at rest" position.

While the foregoing has presented specific embodiments of the present invention, it is to be understood that these embodiments are indeed presented by way of example only. It is expected that others will perceive differences which, while varying from the foregoing, do not depart from the spirit and scope of the invention as herein described and claimed.

I claim:

1. Apparatus for controlling electrical signals, said apparatus comprising:
    housing means having a top;
    means to releasably secure said housing means to a user's arm;
    handle assembly means, shaped and positioned to be manipulable by said user's hand when said housing means is secured to said user's arm;
    means connecting said handle assembly means and said housing means;
    means enabling movement of said handle assembly means with respect to said housing means;
    means to transmit said electrical signals to and from said apparatus; and
    means to control said signals responsive to the movement of said handle assembly means.

2. The apparatus as recited in claim 1 wherein said handle assembly means is movable in a fore-and-aft direction with respect to said housing means.

3. The apparatus as recited in claim 1 wherein said handle assembly means is movable in a side-to-side direction with respect to said housing means.

4. The apparatus as recited in claim 1 wherein said handle assembly means is movable in an up-and-down direction with respect to said housing means.

5. The apparatus as recited in claim 1 wherein said housing means top is contoured to accommodate said user's arm.

6. The apparatus as recited in claim 1 wherein at least one said signal control means is a variable resistive element.

7. The apparatus as recited in claim 1 wherein at least one said signal control means is characterized by selectively openable and closeable contact points.

8. The apparatus as recited in claim 1 wherein said control means includes secondary control means mounted on said handle assembly.

9. The apparatus as recited in claim 8 wherein said secondary control means includes at least one trigger control.

10. The apparatus as recited in claim 8 wherein said secondary control means includes at least one intermittently operable push button.

11. The apparatus as recited in claim 1 including means to limit movement of said connecting means,
    said limiting means preventing simultaneous engagement of selected of said signal control means when said handle assembly means is moved.

12. The apparatus as recited in claim 11 wherein said limiting means includes a plate having a cutout formed therethrough,
    said connecting means protruding through said cutout and limited in its movement by contact with said plate about the periphery of said cutout.

13. The apparatus as recited in claim 12 wherein said plate is removably attachable to said housing means.

14. The apparatus as recited in claim 12 wherein said limiting means further includes a plurality of said plates having cutouts of differing configurations.

15. The apparatus as recited in claim 1 wherein said releasable securing means includes at least one strap member having two ends,
    the first of said ends attached to said housing means; and
    means to releasably secure said second end to said housing means.

16. Apparatus for controlling electrical signals, said apparatus comprising:
    housing means having a top;
    means to releasably secure said housing means to a user's arm proximate said user's wrist;
    handle assembly means separate from said housing means;
    said handle assembly means shaped and positioned to be manipulable by said user's hand when said housing means is secured to said user's arm;
    means connecting said housing means and said handle assembly means;
    means enabling movement of said handle assembly means with respect to said housing means;
    means to transmit said electrical signals to and from said apparatus; and
    means to control said signals responsive to the movement of said handle assembly means.

17. The apparatus as recited in claim 16 wherein said handle assembly means includes:
    a base; and
    an upstanding handle pivotally attached to said base.

18. The apparatus as recited in claim 17 wherein at least one said signal control means is mounted within said base,
    said control means operable responsive to the movement of said handle with respect to said base.

19. The apparatus as recited in claim 17 wherein said connecting means is extendable from and moveable into said housing means, thereby allowing movement of said handle assembly means toward and away from said housing means.

20. The apparatus as recited in claim 19 wherein said housing means includes means to limit the travel of said connecting means with respect to said housing means.

21. The apparatus as recited in claim 19 wherein said housing means has at least one said signal control means mounted therewithin operable responsive to the movement of said handle assembly means toward and away from said housing means.

22. The apparatus as recited in claim 16 wherein said signal control means includes variable resistance means.

23. The apparatus as recited in claim 16 wherein said signal control means includes selectively openable and closeable contact means.

24. The apparatus as recited in claim 16 wherein said signal control means includes variable resistance means and selectively openable and closeable contact means.

25. The apparatus as recited in claim 24 including means to select said variable resistance means or said contact means to function as said control means.

26. The apparatus as recited in claim 16 wherein said releasable securing means includes at least one strap member having two ends,
the first of said ends attached to said housing means; and
means to releasably secure said second end to said housing means.

27. Apparatus for controlling electrical signals, said apparatus comprising:
housing means having a top,
said housing means being hollow;
means to releasably secure said housing means to a user's arm;
handle assembly means,
said handle assembly means shaped and positioned to be manipulable by said user's hand when said housing means is secured to said user's arm;
means connecting said housing means and said handle assembly means;
means gripping said connecting means and said housing means to enable movement of said connecting means with respect to said housing means,
said gripping means including a switchblock within which said connecting means is received;
a frame member;
said switchblock being pivotally mounted along a first axis within said frame member,
said frame member pivotally mounted within said housing along a second axis;
means to transmit said electrical signals to and from said apparatus; and
means to control said signals responsive to the movement of said connecting means.

28. The apparatus as recited in claim 27 wherein said control means includes means operable responsive to movement of said switchblock about said first axis.

29. The apparatus as recited in claim 27 wherein said control means includes means operable responsive to movement of said frame member about said second axis.

30. The apparatus as recited in claim 27 wherein said signal control means includes a first control element operable responsive to movement of said switchblock about said first axis, and
a second control element operable responsive to movement of said frame about said second axis.

31. The apparatus as recited in claim 30 wherein said first and second control elements operate independently one from another.

32. The apparatus as recited in claim 30 including means to prevent simultaneous engagement of said first and second control elements.

33. The apparatus as recited in claim 32 wherein said prevention means includes means to limit movement of said connecting means when said handle assembly means is moved.

34. The apparatus as recited in claim 33 wherein said limiting means includes a plate having a cutout formed therethrough,
said connecting means protruding through said cutout and limited in its movement by contact with said plate about the periphery of said cutout.

35. The apparatus as recited in claim 34 wherein said plate is removably attachable to said housing means.

36. The apparatus as recited in claim 34 wherein said limiting means further includes a plurality of said plates having cutouts of differing configurations.

37. The apparatus as recited in claim 27 wherein said signal control means includes variable resistive means.

38. The apparatus as recited in claim 27 wherein said signal control means includes selectively openable and closeable contact means.

39. The apparatus as recited in claim 27 wherein said signal control means includes variable resistive means and selectively openable and closeable contact means.

40. The apparatus as recited in claim 39 including means to select said variable resistive means or said contact means to operate responsive to movement of said handle assembly means.

41. The apparatus as recited in claim 27 wherein said frame member includes 2 pairs of oppositely disposed sides.

42. The apparatus as recited in claim 41 wherein said first axis passes through the first of said pairs of opposed sides.

43. The apparatus as recited in claim 41 wherein said second axis passes through the second of said pairs of opposed sides.

44. The apparatus in claim 41 wherein said frame member is rectangular.

45. The apparatus as recited in claim 41 wherein said frame member is square.

46. The apparatus as recited in claim 27 wherein said frame member is circular.

47. The apparatus as recited in claim 27 wherein said first and second axes are perpendicular to each other.

48. The apparatus as recited in claim 27 wherein said releasable securing means includes at least one strap member having two ends,
the first of said ends attached to said housing means; and
means to releasably secure said second end to said housing means.

49. The apparatus as recited in claim 27 wherein said connecting means is slidably received by said switchblock.

50. The apparatus as recited in claim 27 wherein said handle assembly means includes a hand grip,
said hand grip having a rest position when not in use; and
means to vary said rest position.

51. The apparatus as recited in claim 27 wherein said control means includes secondary control means mounted on said hand grip.

52. The apparatus as recited in claim 51 wherein said secondary control means includes at least one trigger control.

53. The apparatus as recited in claim 51 wherein said secondary control means includes at least one intermittently operable push button control.

* * * * *